(12) United States Patent
Wheelock

(10) Patent No.: US 11,991,560 B2
(45) Date of Patent: May 21, 2024

(54) PROPAGATION OF QUALITY OF SERVICE (QoS) MANAGEMENT THROUGH A HETEROGENOUS NETWORK

(71) Applicant: ARRIS Enterprises LLC, Suwanee, GA (US)

(72) Inventor: Ian G. Wheelock, Cork (IE)

(73) Assignee: ARRIS ENTERPRISES LLC, Horsham, PA (US)

(*) Notice: Subject to any disclaimer, the term of this patent is extended or adjusted under 35 U.S.C. 154(b) by 166 days.

(21) Appl. No.: 17/686,808

(22) Filed: Mar. 4, 2022

(65) Prior Publication Data
US 2022/0295352 A1    Sep. 15, 2022

Related U.S. Application Data

(60) Provisional application No. 63/158,611, filed on Mar. 9, 2021.

(51) Int. Cl.
*H04W 28/24* (2009.01)
*H04W 28/02* (2009.01)

(52) U.S. Cl.
CPC ....... *H04W 28/24* (2013.01); *H04W 28/0263* (2013.01); *H04W 28/0268* (2013.01)

(58) Field of Classification Search
CPC .. H04L 47/24; H04W 28/0268; H04W 28/24; H04W 28/02; H04W 28/0263
See application file for complete search history.

(56) References Cited

U.S. PATENT DOCUMENTS

| 2018/0098265 A1 | 4/2018 | Tomici et al. | |
| 2021/0219186 A1* | 7/2021 | Canpolat | H04W 28/24 |
| 2021/0329500 A1* | 10/2021 | Cariou | H04W 74/002 |

(Continued)

FOREIGN PATENT DOCUMENTS

| CN | 104104620 A | * 10/2014 | ......... H04L 47/2441 |
| CN | 115802094 A | * 3/2023 | ........... H04N 21/647 |
| WO | WO-2015042389 A1 | * 3/2015 | ............. H04L 47/14 |

OTHER PUBLICATIONS

Thomas Derham (Broadcom): "CR 2693 Mirrored SCS", IEEE Draft; 1 i-19-0420-04-000M-CR-2693-MIRRORED-SCS, IEEE-SA Mentor, Piscataway, NJ USA vol. 802.11m, No. 414 May 2019 (May 14, 2019), pp. 1-16, XP068151196 (Year: 2019).*

(Continued)

*Primary Examiner* — Mehmood B. Khan
(74) *Attorney, Agent, or Firm* — Wenderoth, Lind & Ponack, L.L.P.

(57) ABSTRACT

A network access device is configured to propagate Quality of Service (QoS) management through a heterogenous network. A Mirrored Stream Classification Service (MSCS) setup request having MSCS information or MSCS information that is proxied to a next hop in an uplink is received. The MSCS information identifies at least one traffic flow associated with a first user priority. A downlink rule is generated that matches the first user priority in the MSCS information in the uplink to a downlink traffic flow. The downlink rule is used to analyze the downlink traffic flow to match the MSCS information in the downlink that is the mirror of the MSCS information in the uplink. The user priority is applied to the downlink that mirrors the MSCS information in the uplink.

20 Claims, 7 Drawing Sheets

(56) References Cited

U.S. PATENT DOCUMENTS

2022/0167373 A1\* 5/2022 Lin .................... H04W 72/569
2023/0199546 A1\* 6/2023 Canpolat .......... H04W 28/0215
370/329

OTHER PUBLICATIONS

International Search Report and the Written Opinion of the International Searching Authority dated Jun. 8, 2022 in International (PCT) Application No. PCT/US2022/018871.
Thomas Derham (Broadcom): "CR 2693 Mirrored SCS", IEEE DRAFT; 11-19-0420-04-000M-CR-2693-MIRRORED-SCS, IEEE-SA Mentor, Piscataway, NJ USA, vol. 802.11m, No. 4 May 14, 2019 (May 14, 2019), pp. 1-16, XP068151196.
International Preliminary Report on Patentability and Written Opinion dated Sep. 21, 2023 in International Application No. PCT/US2022/018871.

\* cited by examiner

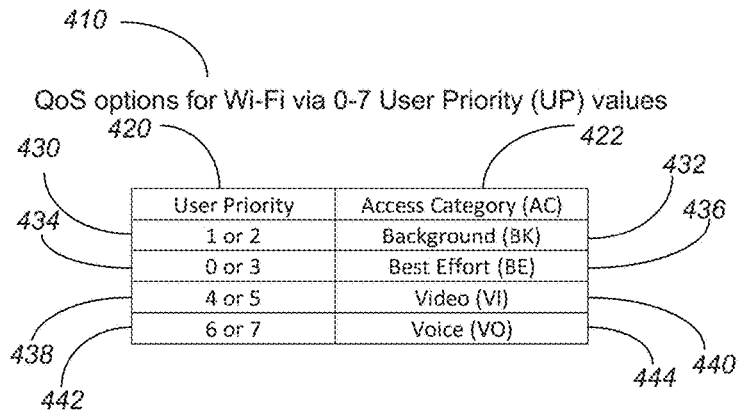

QoS options for Wi-Fi via 0-7 User Priority (UP) values

| User Priority | Access Category (AC) |
|---|---|
| 1 or 2 | Background (BK) |
| 0 or 3 | Best Effort (BE) |
| 4 or 5 | Video (VI) |
| 6 or 7 | Voice (VO) |

Fig. 4a

RFC8325 DiffServ to WMM

| IETF Diffserv Service Class | PHB | Reference RFC | IEEE 802.11 User Priority | Access Category |
|---|---|---|---|---|
| Network Control | CS7 | 2472 | 7 or 0 | AC_VO (Voice) AC_BE (Best Effort) |
| Network Control | CS6 | 2474 | 7 or 0 | AC_VO (Voice) AC_BE (Best Effort) |
| Telephony | EF | 3246 | 6 | AC_VO (Voice) |
| Voice-Admin | VA | 5865 | 6 | AC_VO (Voice) |
| Signaling | CS5 | 2474 | 5 | AC_VI (Video) |
| Multimedia Conferencing | AF41, AF42, AF43 | 2597 | 4 | AC_VI (Video) |
| Real-Time Interactive | CS4 | 2474 | 4 | AC_VI (Video) |
| Multimedia Steaming | AF31, AF32, AF33 | 2597 | 4 | AC_VI (Video) |
| Broadcast Video | CS3 | 2474 | 4 | AC_VI (Video) |
| Low Latency Data | AF21, AF22, AF23 | 2597 | 3 | AC_BE (Best Effort) |
| OAM | CS2 | 2474 | 0 | AC_BE (Best Effort) |
| High Throughput Data | AF11, AF12, AF13 | 2597 | 0 | AC_BE (Best Effort) |
| Standard | DF | 2474 | 0 | AC_BE (Best Effort) |
| Low Priority Data | CS1 | 3662 | 1 | AC-BK (Background) |

Fig. 4b

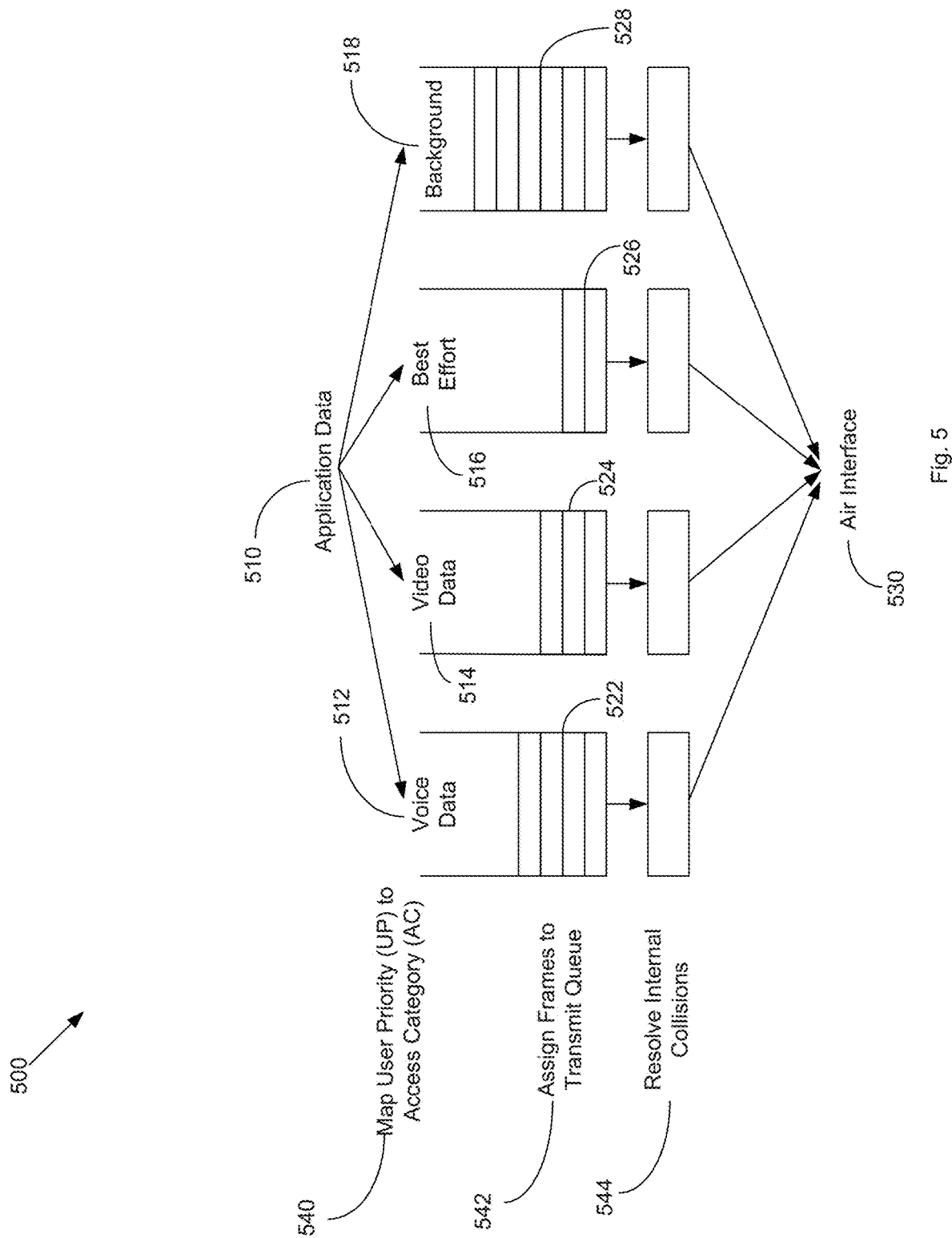

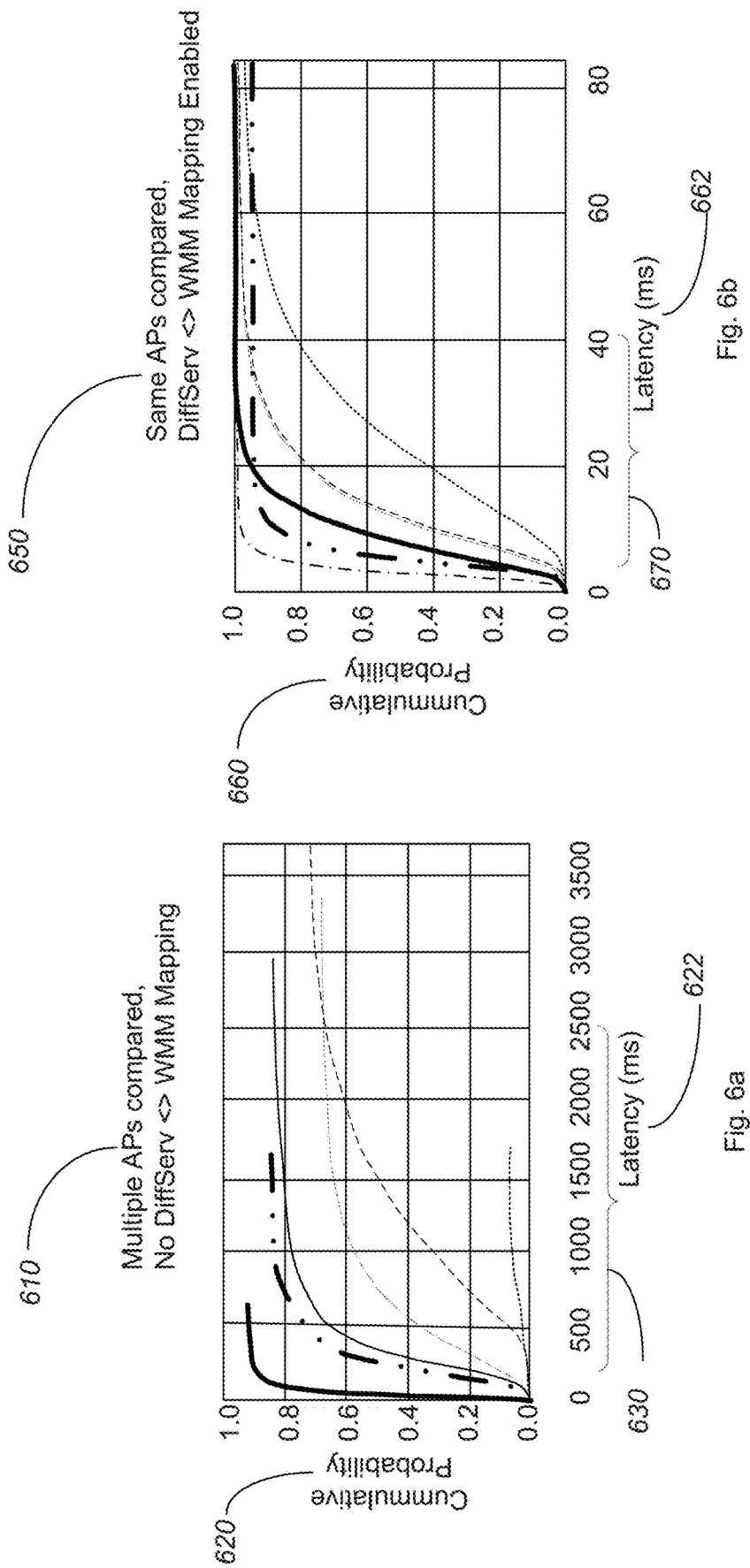

PROPAGATION OF QUALITY OF SERVICE (QoS) MANAGEMENT THROUGH A HETEROGENOUS NETWORK

BACKGROUND

The subject matter of the present disclosure relates generally to extending Mirrored Stream Classification Service (MSCS) to devices between a station (STA) and a network access device, such as an Access Point (AP).

A station is associated with an AP. Mirrored Stream Classification Service (MSCS is used to communicate QoS related information. APs are capable of receiving MSCS information from a station in direct communication with the AP to automatically create a rule for handling User Priority (UP) Values received in uplink traffic. The rule allows an AP to apply specific UP values to downlink traffic.

Wireless Extenders or other network access devices may be used in the home wireless local area network (WLAN) to extend the wireless network range of an AP. When a station associates with an AP through an Extender, stations are able to access the WLAN provided by the AP. Currently, however, when a station performs MSCS setup with an Extender, the Extender does not forward the MSCS information to the AP. So the AP does not know to apply the UP values provided in the MSCS setup information provided to the Extender by the station. Thus, the AP does not associate the UP values in downlink traffic that the station identified in the MSCS setup information.

SUMMARY

An aspect of the present disclosure involves dynamically generating downlink rules at an AP that match QoS of received traffic. MSCS setup information or MSCS that is proxied to a next hop in an uplink is used to generate the dynamic rules.

A network access device includes a memory that stores computer-readable instructions; and a processor configured to execute the computer-readable instructions to receive one of a Mirrored Stream Classification Service (MSCS) setup request having MSCS information or MSCS information that is proxied to a next hop in an uplink, the MSCS information identifies at least one traffic flow associated with a first user priority (UP), dynamically generate a downlink rule to store in the memory that matches the first user priority in the MSCS information in the uplink to a downlink traffic flow, use the downlink rule from the memory to analyze the downlink traffic flow to match the MSCS information in the downlink that is a mirror of the MSCS information in the uplink, and apply the user priority to the downlink that mirrors the MSCS information in the uplink.

The MSCS information may include a station (STA) source MAC address, the first UP, and a template of fields for creating at mirrored classifier to apply to downlink traffic to the STA source MAC address with the first UP.

The processor dynamically generate a downlink rule that, when a packet in an uplink is received that matches the first user priority, applies fields from a template provided by the MSCS information to apply to the downlink traffic flow and uses the first user priority for the downlink traffic flow.

When the next hop is an Access Point (AP), the AP automatically creates the downlink rule to ensure that the first user priority in the MSCS information in the uplink is applied to traffic flow having the MSCS information in the downlink that is a mirror of the MSCS information in the uplink.

The AP ignores incoming downlink Differentiated Services Code Point (DSCP) values, the AP maps user priority values derived from the MSCS information in the uplink to Wi-Fi Multimedia-Access Categories (WMM-AC).

The uplink may be a Wi-Fi backhaul, a wired backhaul, or a combination of the Wi-Fi backhaul and the wired backhaul to the next hop in the uplink.

When the next hop in the uplink is an AP, the AP receives the MSCS setup request marked with a Quality of Service (QoS) to apply to a traffic flow in a downlink having the MSCS information in the downlink that is a mirror of the MSCS information in the uplink.

When the next hop in the uplink is an Extender, the Extender receives the MSCS information that is proxied to the Extender and to the next hop in the uplink.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings:

FIG. 4a is a table of QoS options for Wi-Fi User Priority (UP) values.

FIG. 4b is a table of a subset of Internet Engineering Task Force (IETF) DiffServ Service Class values.

FIG. 5 illustrates queues for different access categories.

FIG. 6a show plots of Cumulative Probability vs latency for multiple APs.

FIG. 6b shows plots of Cumulative Probability vs latency where DiffServ to WMM mapping is enabled.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to dynamically generating downlink rules at an AP that match QoS of received traffic. MSCS setup information or MSCS that is proxied to a next hop in an uplink is used to generate the dynamic rules.

Figure 1:
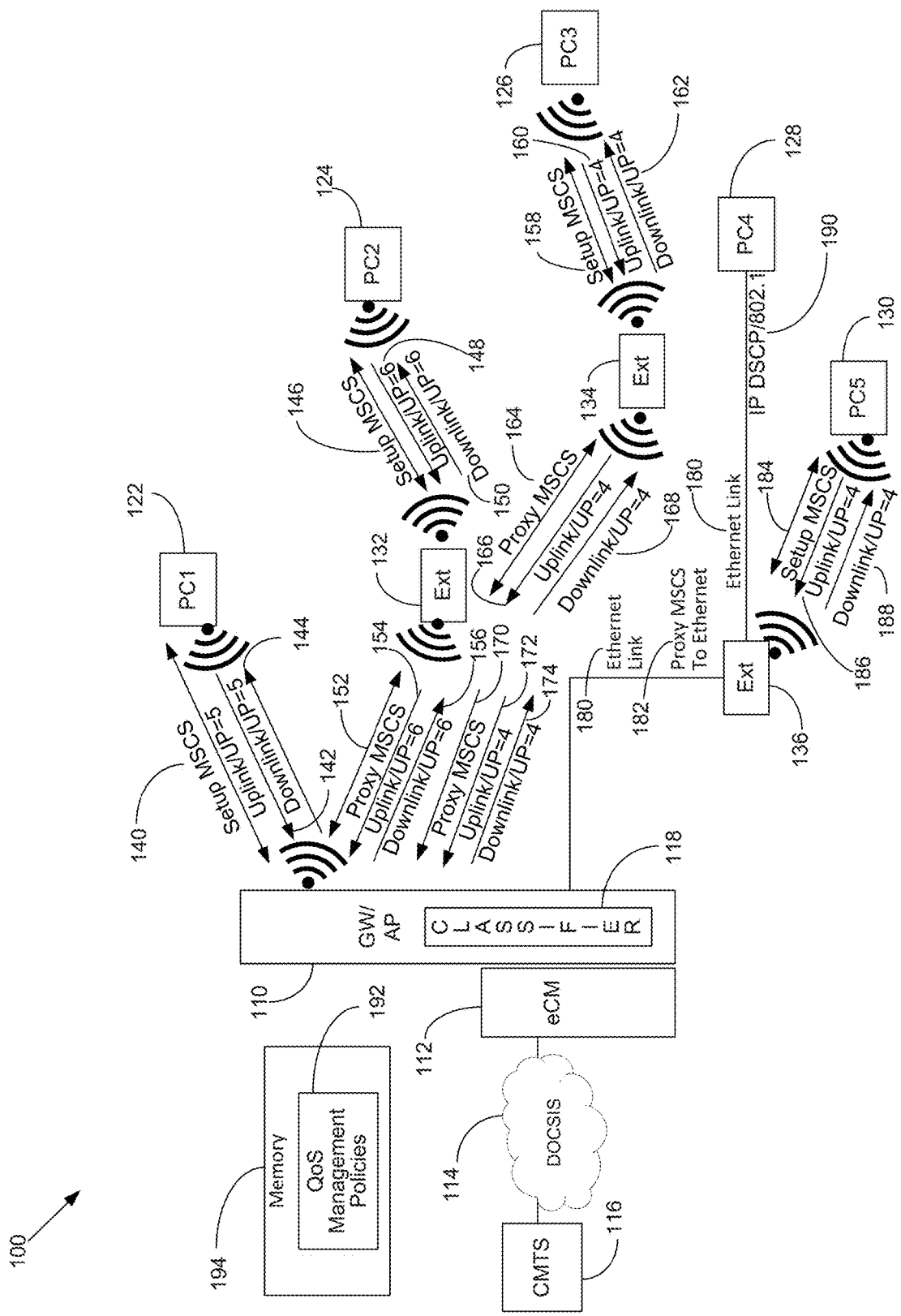
FIG. 1 illustrates a schematic diagram of a system 100 for providing Quality of Service (QoS) management in Wi-Fi Networks.

FIG. 1 illustrates a schematic diagram of a system 100 for providing Quality of Service (QoS) management in Wi-Fi Networks.

System 100 shows Gateway (GW)/Access Point (AP) 110, a cable modem, e.g., embedded Cable Modem (eCM) 112, DOCSIS network 114 and Cable Modem Termination System (DMTS) 116. FIG. 1 also shows stations, PC1 122, PC2 124, PC3 126, PC4 128, and PC5 130. PC1 122, PC2 124, PC3 126, and PC5 130 may be mobile stations, while PC4 128 is shown having a wired Ethernet connection 180. Extenders 132, 134, 136 couple PC2 124, PC3 126, PC5 130 to AP 110.

In FIG. 1, PC1 122 starts Setup MSCS 140 with AP 110. Setup MSCS 140 may be the result of a new application starting that requires a high user priority. For example, PC1 122 may start a Voice over Wi-Fi call that needs User Priority j(UP) 5. As part of the association of PC1 122 with AP 110 for the Voice over Wi-Fi, PC1 122 will send Setup MSCS 140 that informs AP 110 to look for certain fields and packets in Uplink 142 with UP=5 that are sent to the AP 110 from PC1 122, and then to setup responsive Downlink 144 with UP 5 144.

Next, referring to Extender 132, without the functions described herein, when Extender 132 receives the Setup MSCS 146, Extender 132 only offers a higher priority, UP=6, in Uplink 148 and Downlink 150. However, Extender 132 that implements the functions described herein will receive Setup MSCS 146, and then Extender 132 performs the same Setup MSCS 146 to the next hop, i.e., AP 110, at Proxy MSCS 152. So, when Extender 132 receives packets in Uplink 148 with UP=6, Extender 132 forwards the packets to AP 110 using Uplink 154 and UP=6.

When AP 110 receives Uplink 154 with UP=6, AP 110 uses Classifier 118 that was setup based on Setup MSCS 146 and Proxy MSCS 152 to send matching downlink packets using Downlink 156 with UP=6. Extender 132 recognizes the packets in Downlink 156 with UP=6 and forwards then to PC2 124 in Downlink 150 using UP=6.

Thus, the proxy function in Extender 132 enables Extender 132 to send Proxy MSCS 152 to AP 110 so that AP 110 will recognize Uplink 154 with UP=6 and send Downlink with UP=6 to Extender 132. Per Setup MSCS 146, Extender 132 knows to forward traffic from Uplink 148 with UP=6 to AP 110 and to forward traffic from AP on Downlink 156 with UP=6 to PC2 124 on Downlink 150 using UP=6.

Turning to Extender 134, PC3 126 sends Setup MSCS 158 to Extender 134. Extender 134 proxies the Setup MSCS 158 to the next hop, i.e., Extender 132, at Proxy MSCS 164. Extender 134 uses Proxy MSCCS 164 to inform Extender 132 to look for certain fields and packets in Uplink 166 with UP=4. Extender 132 uses Proxy MSCCS 170 to inform AP 110 to look for certain fields and packets in Uplink 172 with UP=4 that are sent to the AP 110 from Extender 132, then setup responsive Downlink 174 with UP=4. So, Extender 134 receives packets in Uplink 160 with UP=4, and Extender 134 forwards the packets to Extender 132 in Uplink 166 with UP=6. When Extender 132 receives packets in Downlink 174 with UP=4 from AP 110, Extender 132 forwards the packets to Extender 134 using Downlink 168 and UP=4. Extender 134 forwards the packets to PC # Extender 134 using Downlink 162 and UP=4.

PC5 130 sends Setup MSCS 184 to Extender 136 that communicates with AP 110 through Ethernet link 180. Extender 126 proxies MSCS to Ethernet 182 to AP 110 to manage QoS between Extender 136 and AP 110 over Ethernet link 180 configured with Setup MSCS 184 by PC5 130. Extender 136 recognizes packets in Uplink 186 with UP=5 and forwards matching downlink packets to PC5 via Downlink 188 using UP=4. PC4 128 will uses IP DSCP/802.1 priority bits 190 to manage QoS. No explicit setup is required and PC4 128 will apply values for QoS. AP 110 may store QoS management policies 192 in memory 194, including a limit on a number of UP and DL rules, and restrictions on permitted UP values to implement.

Thus, The MSCS information in Setup MSCS 146 includes the station (STA) source Media Access Control (MAC) address (to identify, for example, PC2 124 that sent Setup MSCS 146), and this is separate from the any possible signaling of a MAC address "FIELD" within the MSCS information for setting up Classifier (TCLASS) 118.

The STA source MAC address is used to match downlink traffic 156. 150 associated with the MSCS provided by PC2 124. So in the downlinks 156. 150, when an incoming packet is received through uplink 148, 154, and matches a STA source MAC address received from a previous MSCS setup 146 sent by a PC2 124, this then triggers the AP 110/Extender 132 to "lookup" to get the list of MSCS classifiers that will apply to this downlink 156. 150. Thus, the STA source MAC address is used to identify the sender of the MSCS, e.g., PC2 124, but STA source MAC address is probably not going to appear in the Classifier 118 list of "FIELDS" that the AP 110 must mirror.

Also, the STA, e.g., PC2 124, never sends explicit "values" in the TCLASS 118 for TCP Port or SRC IP, etc. The MSCS information provided by the Setup MSCS 146 only identifies specific "fields", and is thus informing the AP 110/Extender 132 that for this MSCS if you see UP=6, then create a filter based on the "template" of fields provided. The AP 110 will then wait for traffic from the STA (based on STA source MAC address) and then check if the traffic has a UP=6, then it will take a snapshot of the values in the template "fields" and create mirrored Classifier 118 for use in the downlink 174 (on any packets received in the downlink destined for the STA source MAC address).

The destination address and destination port are not included in the MSCS information in Setup MSCS 146. The destination address and destination port are determined after the Setup MSCS 146 has been sent to the AP 110, and are only setup as a result of the events discussed above.

Thus, after the Setup MSCS 146 has been accepted by the AP 110/Extender 132, and after the AP 110/Extender 132 has received a packet in the uplink 146, 154 from PC2 124 with a matching UP value, the AP 110/Extender 132 then uses the template of fields (which is a set of "FIELDS" corresponding to packet header "fields") in the MSCS information in Setup MCSC 146 and Proxy MSCS 152 to copy out the required "values", and dynamically create mirrored Classifier 118 for subsequent packets in downlink 156, 150 that are being sent to the STA source MAC address of PC2 124, and when matched, have the UP set as per Setup MSCS 146 and Proxy MSCS 152.

Figure 2:
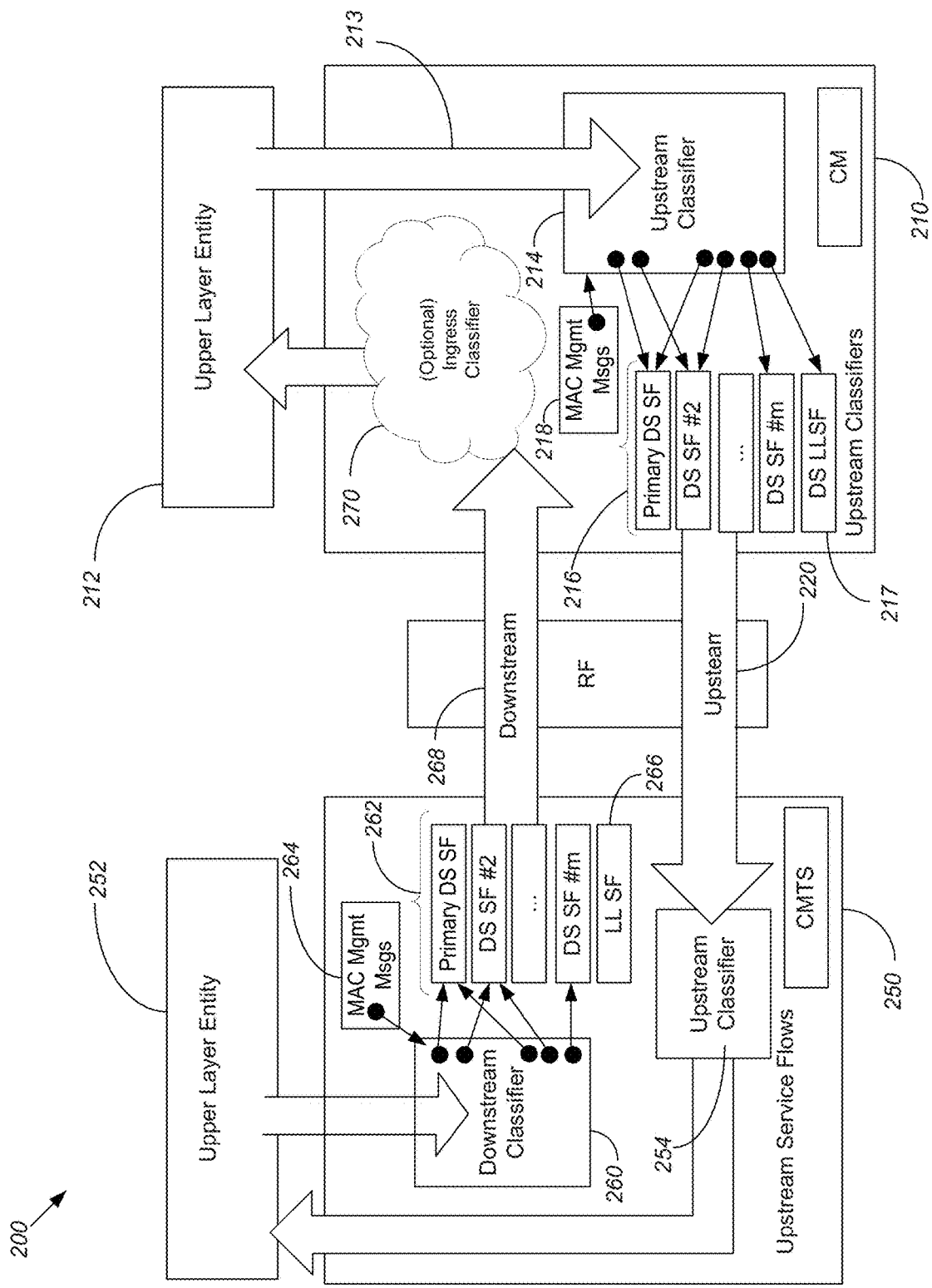
FIG. 2 illustrates operation of classifiers for handling service flows 200.

FIG. 2 illustrates operation of classifiers for handling service flows 200.

In FIG. 2, a Cable Modem (CM) 210 and a Cable Modem Termination Service (CMTS) 250 are shown. To provide QoS management as described above with respect to FIG. 1, MSCS is added to DOCSIS Low Latency Service Flow (LLSF) handling. CM 210 includes an CM Upper Layer Entity 212 that receives upstream service flows 213 that are provided to upstream classifier 214. The upstream service flows 213 are analyzed and provided to one of the upstream classifiers 216. MAC Management Messages 218 are used to add, change, and delete specific upstream service flows handled by upstream classifier 214. Upstream SFs 220 from the upstream classifiers 216 are directed to CMTS 250. The upstream SFs 220 received by upstream classifiers 254 in CMTS 250 before processed by the CMTS Upper Layer Entity 252.

Downstream SF are provided to downstream classifier 260, which directs the downstream SFs to one of the downstream classifiers 262. The downstream classifiers 262 provide downstream SFs 268 to CM 210. MAC Management Messages 264 are used to add, change, and delete specific downstream service flows handled by downstream classifier 260.

CM 210 may include an ingress classifier 270 before being directed to CM Upper Layer Entity 212 that communicates with an Access Point, e.g., AP 110 shown in FIG. 1.

Currently, Low Latency DOCSIS (LLD) involves creating a LLSF 217 and Upstream Classifier 214 directing matching traffic to the LLSF 217, while the remaining non-LL traffic is directed to a classical SF. Upstream LL traffic 213 relies mostly on DSCP matching (e.g., CS5, etc.). However, DSCP is often lost on returning traffic in the downstream direction. To address this issue. MSCS may be used to cause the CM 210 (and/or Gateway) to dynamically generate a matching classifier, based on MSCS information such as 5-tuple, that can be signaled to CMTS 250 to enable classification of downstream traffic to a downstream LL SF 266. This enables the CM 210 to determine what is LL before the traffic is sent upstream. This information can be used to enable the creation of a dynamic classifier to be signaled to the CMTS 250. DSX, or a lighter weight signaling option, may be used to quickly add/remove the classifiers. The CM 210 may age out these classifiers as required with other signals.

Figure 3:
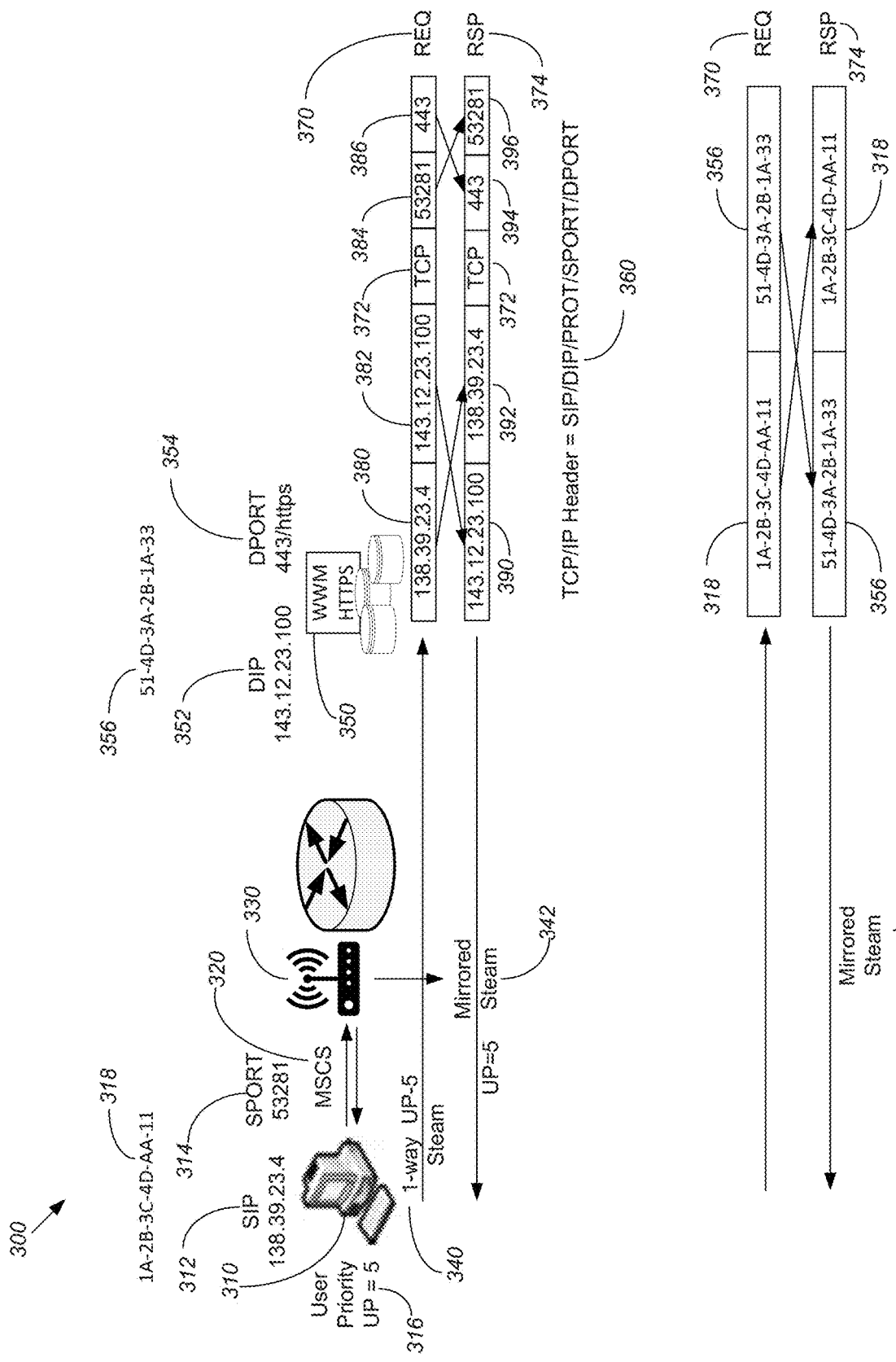
FIG. 3 illustrates a system providing MSCS.

FIG. 3 illustrates a system 300 providing MSCS.

In FIG. 3, a Wi-Fi device/STA 310 may signal a unique 1-way traffic flow of data from Wi-Fi device/STA 310 to an Access Point (AP) 330, potentially to receive differentiated QoS. STA 310 may setup MSCS to provide UP=5. MSCS 320 enables the AP 330 to use the 1-way signaled flow 340 with UP=5 316 from the STA 310 to create a dynamic rule that is the "mirror" or reverse of that flow, matching return packets and assigning the same QoS to the mirrored stream 342. During Association, STA 310 can signal MSCS 320 with rules to the AP 330.

A dynamic rule is generated and maintained by AP 330 for future downlink packets (with associate timeouts/etc.). Incoming downlink DSCP value are ignored by the AP 330. The AP maps incoming service flows to the same UP value, e.g., UP=5, which are subsequently mapped to WMM AC.

As shown in FIG. 3, STA 310 includes source IP address (SIP) 312 having a value of 138.39.23.4 and source port number (SPORT) 314 having a value of 53281. Server 350 is the destination for the 1-way UP=5 uplink 340. Server 350 has a destination IP address (DIP) 352 having a value of 143.12.23.100 and destination port number (DPORT) 354 having a value of.

MSCS 320 informs AP 320 to look for certain fields and packets in 1-way UP=5 uplink 340 that are sent to the AP 330 from STA 310. AP 320 derives a MSCS rule that mirrors 1-way UP=5 uplink 340 in the mirrored downlink stream 342. Return packets are matched and assigned the same QoS, i.e., UP=5, to the mirrored stream 342.

The general form for a TCP/IP header 360 is shown. The TCP/IP header for the uplink REQ 370 includes has a SIP 380 of 138.39.23.4, a DIP 382 of 143.12.23.100, TCP field values 372, a SPORT 384 of 53281, and a DPORT 386 of 443. The mirrored stream 342 for RSP 374 has the values reversed with a SIP 390 of 143.12.23.100, a DIP 392 of 138.39.23.4, TCP field values 372, a SPORT 394 of 443, and a DPORT 396 of 53281. MSCS 320 may also indicate that a source MAC 318 in the uplink REQ 370 that may be used as the destination MAC address 318 in the mirrored stream 342 for downlink RSP 374, and that the destination MAC 356 in the uplink REQ 370 that may be used as the source MAC address 356 in the mirrored stream 342 for downlink RSP 374.

FIG. 4a illustrates a table 410 QoS options for Wi-Fi via 0-7 User Priority (UP) values.

In FIG. 4a User Priority values 420 include 1 or 2 430 for an Access Categories 422 of Background (BK) 432. User Priority values 0 or 3 434 is for Access Categories 422 of Best Effort (BE) 436, User Priority 4 or 5 438 is for Video (VI) 440, and User Priority 6 or 7 442 is for Voice (VO) 444.

In FIG. 4b, a subset of values for Differentiated services (DiffServ) to Wi-Fi Multimedia (WMM) 450 are shown. DSCP marking uses 6-bits to provide up to 64 classes (or code points) for traffic. Thus, FIG. 4b is just a subset of the possible 64 classes. FIG. 4b shows values for Internet Engineering Task Force (IETF) DiffServ Service Classes 460, Per Hop Behavior (PHB) 462, Reference Request for Comments (RFC) 464, IEEE 802.11 User Priority 466, and Access Category 468. For example, for Service Class Telephony 470, PHB is Expedited Forwarding (EF) 472, the associated RFC is 3246 474, the IEEE 802.11 User Priority is 6 476, and the Access Category is AC_VO (Voice) 478.

FIG. 5 illustrates queues for different access categories 500.

In FIG. 5, application data 510 is assigned to four different queues 512, 514, 516, 518. The four queues 512, 514, 516, 518 relate to four different "access categories" that are defined by WMM. User Priorities (UP) are mapped to the different Access Categories (AC) 540. Application data is separated into Voice (VO) queue 512, Video (VI) queue 514, Best Effort (BE) queue 516, and Background (BK) queue 518. Each of the four queues 512, 514, 516, 518 has its own transmit priority. The frames are assigned to transmit queues 542. Each of the four queues 512, 514, 516, 518 has its own unique channel access parameters directly impacting on access to the Wi-Fi Air interface 530 and have an immediate impact on providing improved Quality of Service to low-latency traffic. The four queues 512, 514, 516, 518 are shown with a different number 522, 524, 526, 528 of frames or packets waiting to be sent. Before being provide to the Air Interface, internal collisions are resolved 544.

FIG. 6a show plots 610 of Cumulative Probability 620 vs latency 622 for multiple APs.

In FIG. 6a, the APs do not have DiffServ to WMM mapping enabled. The general latency 630 value ranges from about 250 to 2500 milliseconds (ms).

In FIG. 6b, DiffServ to WMM mapping is enabled 650.

FIG. 6b shows plots of Cumulative Probability 660 vs latency 662 for multiple APs with DiffServ to WMM mapping enabled. The general latency 670 value ranges from about 2 ms to 40 ms.

Figure 7:
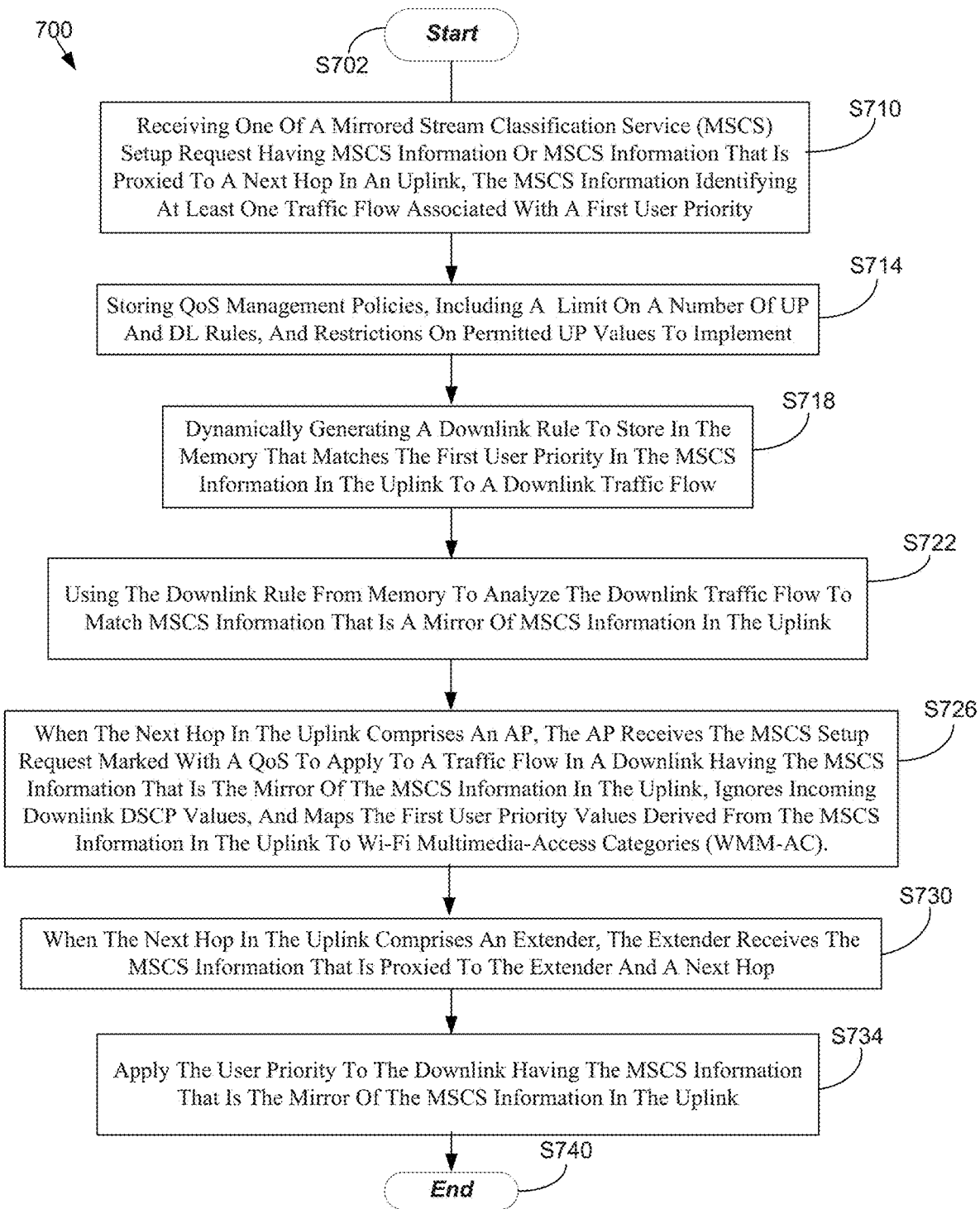
FIG. 7 is a flow chart of a method for providing Quality of Service (QoS) management in Wi-Fi Networks.

FIG. 7 is a flow chart of a method for providing Quality of Service (QoS) management in Wi-Fi Networks.

In FIG. 7, method 700 starts (S702), and either a Mirrored Stream Classification Service (MSCS) Setup Request having MSCS Information or MSCS Information that is proxied to a next hop in an uplink is received. The MSCS Information identifies at least one traffic flow associated with a first user priority S710. Referring to FIG. 1, Extender 132 receive Setup MSCS 146. Extender 132 may also receive MSCS Information 164 that was proxied from Extender 134.

AP may store QoS management policies, including a limit on a number of UP and DL rules, and restrictions on permitted UP values to implement S714. Referring to FIG. 1, AP 110 may store QoS management policies 192 in memory 194, including a limit on a number of UP and DL rules, and restrictions on permitted UP values to implement.

A downlink rule that matches the first user priority in the MSCS Information in the Uplink to a Downlink traffic flow is dynamically generated S718. Referring to FIG. 3, a dynamic rule is generated and maintained by AP 330 for future downlink packets (with associate timeouts/etc.). Incoming downlink DSCP value are ignored by the AP 330.

The Downlink rule from memory is used to analyze the Downlink traffic flow to match MSCS Information that is a mirror of MSCS Information in the Uplink S722. Referring to FIG. 2, MSCS may be used to cause the CM 210 (and/or Gateway) to dynamically generate a matching classifier, based on MSCS information such as 5-tuple, that can be signaled to CMTS 250 to enable classification of downstream traffic to a downstream LL SF 266

When the next hop in the Uplink comprises an AP, the AP receives the MSCS Setup Request marked with a QoS to apply to a traffic flow in a Downlink having the MSCS Information that is the mirror of the MSCS Information in the Uplink, the AP ignores incoming Downlink DSCP values, and maps user priority values derived from the MSCS Information in the Uplink to Wi-Fi Multimedia-Access Categories (WMM-AC) S726. Referring to FIG. 1, when AP 110 receives Uplink 154 with UP=6, AP 110 uses a classifier that was setup based on Setup MSCS 146 and Proxy MSCS 152 to send matching downlink packets using Downlink 156 with UP=6. Extender 132 recognizes the packets in Downlink 156 with UP=6 and forwards then to PC2 124 in Downlink 150 using UP=6. Referring to FIG. 3, incoming downlink DSCP value are ignored by the AP 330. The AP maps incoming service flows to the same UP value, e.g., UP=5, which are subsequently mapped to WMM AC.

When the next hop in the Uplink comprises an Extender, the Extender receives the MSCS Information that is proxied to the Extender and a next hop S730. Referring to FIG. 1, Extender 132 that implements the functions described herein will receive Setup MSCS 146, and then Extender 132 performs the same Setup MSCS 146 to the next hop, i.e., AP 110, at Proxy MSCS 152.

The user priority is applied to the Downlink having the MSCS Information that is the mirror of the MSCS Information in the Uplink S734. Referring to FIG. 3, MSCS 320 enables the AP 330 to use the 1-way signaled flow with UP=5 340 from the STA 310 to create a dynamic rule that is the "mirror" or reverse of that flow, matching return packets and assigning the same QoS to the mirrored stream 342.

The method then ends (S740).

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A network access device, comprising:
a memory storing computer-readable instructions; and
a processor configured to execute the computer-readable instructions to:
  receive one of a Mirrored Stream Classification Service (MSCS) setup request having MSCS information or MSCS information that is proxied to a next hop in an uplink, the MSCS information identifies at least one traffic flow associated with a first user priority (UP);
  dynamically generate a downlink rule to store in the memory that matches the first user priority in the MSCS information in the uplink to a downlink traffic flow;
  use the downlink rule from the memory to analyze the downlink traffic flow to match the MSCS information in the downlink that is the mirror of the MSCS information in the uplink;
  ignore incoming Differentiated Services Code Point (DSCP) values of the downlink;
  apply the user priority to the downlink that mirrors the MSCS information in the uplink; and map the first UP to Wi-Fi Multimedia-Access Categories (WMM-AC).

2. The network access device of claim 1, wherein the MSCS information includes a station (STA) source MAC address, the first UP, and a template of fields for creating a mirrored classifier to apply to downlink traffic to the STA source MAC address with the first UP.

3. The network access device of claim 1, wherein the processor dynamically generate a downlink rule that, when a packet in an uplink is received that matches the first user priority, applies fields from a template provided by the MSCS information to apply to the downlink traffic flow and uses the first user priority for the downlink traffic flow.

4. The network access device of claim 1, wherein the next hop is an Access Point (AP), the AP automatically creates the downlink rule to ensure that the first user priority in the MSCS information in the uplink is applied to traffic flow having the MSCS information in the downlink that is a mirror of the MSCS information in the uplink.

5. The network access device of claim 4, wherein the AP ignores incoming downlink Differentiated Services Code Point (DSCP) values, the AP maps user priority values derived from the MSCS information in the uplink to Wi-Fi Multimedia-Access Categories (WMM-AC).

6. The network access device of claim 1, wherein the uplink comprises a Wi-Fi backhaul, a wired backhaul, or a combination of the Wi-Fi backhaul and the wired backhaul to the next hop in the uplink.

7. The network access device of claim 1, wherein the next hop in the uplink comprises an AP, the AP receiving the MSCS setup request marked with a Quality of Service (QoS) to apply to a traffic flow in a downlink having the MSCS information in the downlink that is a mirror of the MSCS information in the uplink.

8. The network access device of claim 1, wherein the next hop in the uplink comprises an Extender, the Extender receiving the MSCS information that is proxied to the Extender and to the next hop in the uplink.

9. A method of propagating Quality of Service (QoS) management information between modules information in a mesh network, comprising:
   receiving one of a Mirrored Stream Classification Service (MSCS) setup request having MSCS information or MSCS information that is proxied to a next hop in an uplink, the MSCS information identifying at least one traffic flow associated with a first user priority (UP);
   dynamically generating a downlink rule to store in memory that matches the first user priority in the MSCS information in the uplink to a downlink traffic flow;
   using the downlink rule from the memory to analyze the downlink traffic flow to match the MSCS in the downlink that is the mirror of the MSCS information in the uplink;
   ignoring incoming Differentiated Services Code Point (DSCP) values of the downlink;
   applying the user priority to the downlink that mirrors the MSCS information in the uplink; and
   mapping the first UP to Wi-Fi Multimedia-Access Categories (WMM-AC).

10. The method of claim 9, wherein the receiving one of the Mirrored Stream Classification Service (MSCS) setup request having MSCS information or the MSCS information that is proxied to the next hop in the uplink comprises receiving a station (STA) source MAC address, the first UP, and a template of fields for creating at mirrored classifier to apply to downlink traffic to the STA source MAC address with the first UP.

11. The method of claim 9, further comprises dynamically generating the downlink rule is performed when a packet in an uplink is received that matches the first user priority, applying fields from a template provided by the MSCS information to apply to the downlink traffic flow and using the first user priority for the downlink traffic flow.

12. The method of claim 9, wherein the receiving the MSCS information that is proxied to the next hop in the uplink comprises receiving the MSCS information that is proxied to an Access Point (AP), the AP automatically creating the downlink rule to ensure that the first user priority in the MSCS information in the uplink is applied to traffic flow having the MSCS information in the downlink that is the mirror of the MSCS information in the uplink.

13. The method of claim 12 further comprising ignoring, by the AP, incoming downlink Differentiated Services Code Point (DSCP) values, and mapping user priority values derived from the MSCS information in the uplink to Wi-Fi Multimedia-Access Categories (WMM-AC).

14. The method of claim 9, wherein the receiving the MSCS information that is proxied to the next hop in the uplink comprises receiving the MSCS information that is proxied to an Access Point (AP), determining from the MSCS information a Quality of Service (QoS) to apply to a traffic flow in a downlink having the MSCS information that is the mirror of the MSCS information in the uplink.

15. The method of claim 9, wherein the receiving the MSCS information that is proxied to the next hop in the uplink comprises receiving the MSCS information that is proxied to an Extender.

16. A non-transitory computer-readable media having computer-readable instructions stored thereon, which when executed by a processor causes the processor to perform operations comprising:
   receiving one of a Mirrored Stream Classification Service (MSCS) setup request having MSCS information or MSCS information that is proxied to a next hop in an uplink, the MSCS information identifying at least one traffic flow associated with a first user priority (UP);
   dynamically generating a downlink rule to store in memory that matches the first user priority in the MSCS information in the uplink to a downlink traffic flow;
   using the downlink rule from the memory to analyze the downlink traffic flow to match the MSCS information in the downlink that is a mirror of the MSCS information in the uplink; and
   ignoring incoming Differentiated Services Code Point (DSCP) values of the downlink;
   applying the user priority to the downlink that mirrors the MSCS information in the uplink; and
   mapping the first UP to Wi-Fi Multimedia-Access Categories (WMM-AC).

17. The non-transitory computer-readable media of claim 16, wherein the receiving one of the Mirrored Stream Classification Service (MSCS) setup request having MSCS information or the MSCS information that is proxied to the next hop in the uplink comprises receiving a station (STA) source MAC address, the first UP, and a template of fields for creating at mirrored classifier to apply to downlink traffic to the STA source MAC address with the first UP.

18. The non-transitory computer-readable media of claim 16, further comprises dynamically generating the downlink rule is performed when a packet in an uplink is received that matches the first user priority, applying fields from a template provided by the MSCS information to apply to the downlink traffic flow and using the first user priority for the downlink traffic flow.

19. The non-transitory computer-readable media of claim 18 further comprising ignoring, by the AP, incoming downlink Differentiated Services Code Point (DSCP) values, and mapping user priority values derived from the MSCS information in the uplink to Wi-Fi Multimedia-Access Categories (WMM-AC).

20. The non-transitory computer-readable media of claim 16, wherein the receiving the MSCS information that is proxied to the next hop in the uplink comprises receiving the MSCS information that is proxied to one of an Access Point (AP) and an Extender.

* * * * *